Figure 1:
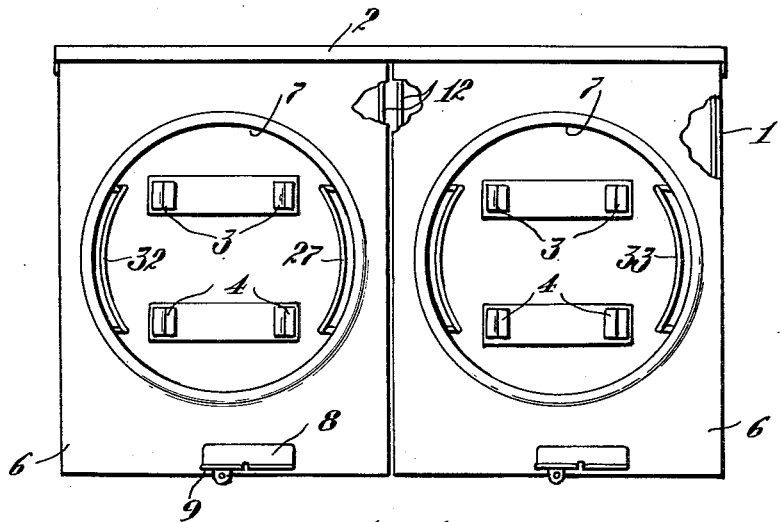

May 22, 1962  G. E. BRACKETT  3,036,244
METER TROUGHS
Filed Jan. 8, 1960

INVENTOR.
George E. Brackett
BY
Roberts, Cushman & Grover
ATT'YS

United States Patent Office 3,036,244
Patented May 22, 1962

3,036,244
METER TROUGHS
George E. Brackett, Candia, N.H., assignor to Basic Products Corporation, Milwaukee, Wis., a corporation of Wisconsin
Filed Jan. 8, 1960, Ser. No. 1,375
4 Claims. (Cl. 317—104)

This invention relates to meter-socket troughs adapted to receive a row of plug-in meters with two or more meters in a row. Each meter position is provided with the necessary meter jaws and wire terminals or bus connections together with insulators appropriate to the particular type of meters employed. Each meter position is provided with an individual cover having an opening to receive the meter. Between the meter positions are cross-channels to receive the juxtaposed flanges of adjacent covers to exclude rain and meet the requirements for rain-tight equipment.

Objects of the present invention are to provide a meter trough which is simple and economical in construction, which is rain-tight, which accurately limits the extent to which the meters may be inserted into the sockets and which is durable and reliable in use.

According to the present invention the meter trough comprises an elongate box having a back and an open front to receive a row of plug-in meters having laterally projecting bases, with a U-shaped channel extending crosswise of the box between adjacent meter positions, the edges of the channel being directed away from the back of the box at the front of the box, a cover at each meter position, each cover having a meter opening and side flange extending toward the back of the box, the side flanges of adjacent covers extending into the aforesaid channel, and stops on the channel with portions behind the aforesaid openings adjacent the periphery thereof to limit the extent to which the adjacent meters may be inserted into the box. Preferably the meter stops are mounted on the channel by means of a support on the channel which has parts projecting laterally from the channel, the stops being detachably mounted on the projecting parts. In the preferred embodiment each channel has a hook on each end to hook into sockets on the sides of the box, the sockets having notches to receive the channel and the hooks overlapping portions of the sockets to prevent the sides of the box from spreading apart, the sides of the channel being cut back at one side so as not to interfere with the usual inturned flange along the upper side of the open front of the box. Preferably the stops comprise bails having their central portions engaging the meter bases with their ends extending under the covers toward the channel and thence rearwardly toward the back. In the preferred embodiment the back has forwardly projecting portions overlapping the ends of the bails to counteract the thrust of the meters when inserted.

Figure 2:
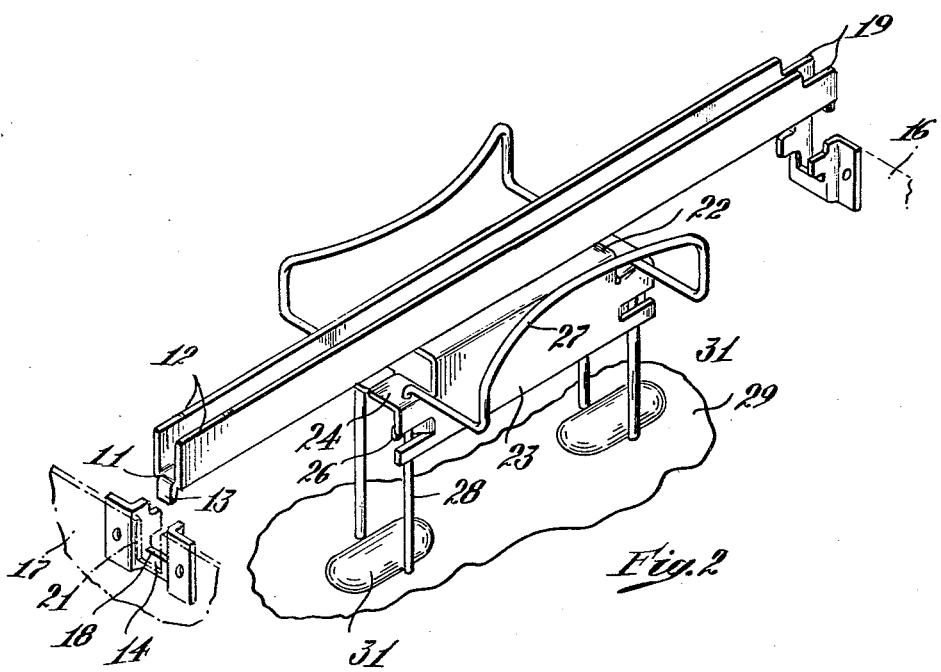

For the purpose of illustration a typical embodiment of the invention is shown in the accompanying drawings in which:

FIG. 1 is a front view; and
FIG. 2 is an isometric view of the aforesaid channel and bails carried by the channel.

In the illustration the invention is shown as applied to a socket of well known construction comprising a rectangular box 1 having an open front and a depending flange 2 extending around the top. Inside the box are the usual pairs of jaws 3 and 4 to receive meters of the plug-in type at a series of meter positions. At each meter position is a cover 6 having a meter opening 7. The upper edge of each cover fits behind flange 2 and the lower part of each cover carries a pivoted latch 8 to engage a lug 9 at the lower edge of the box. Bridging the top and bottom sides of the box between the meter positions is a channel having a bottom 11 and sides 12. The bottom extends beyond the sides to form tabs 13 at opposite ends of the channel, the tabs being bent at right angles to form hooks which extend into sockets 14 fastened to the top and bottom sides 16 and 17 of the box. Each socket comprises a strap having its central portion 14 offset inwardly a distance greater than the thickness of the hooks 13. The sockets are provided with notches 18 whose edges abut the sides of the channel to hold the channel firmly in position. The sides 12 of the channel are cut back at one end as indicated at 19 so that the channel may be lifted out of the socket without interference with the flange 2. The bottom of the box has a notch 21 in alignment with the channel, the depth and width of the notch approximating the corresponding internal dimensions of the channel. Each of the covers 6 has flanges along its edges, the flanges along their juxtaposed edges fitting into the channel and the other flanges overlapping the box.

Fast to the bottom of the channel is an inverted U-shaped bracket 22 having depending legs 23 and depressed end portions 24. At each end of each leg a tab 26 is struck up and the depressed portions 24 have openings to receive a bail comprising a central portion 27 and depending legs 28 which extend through the aforesaid openings and under the tabs 26. As shown in FIG. 1 the central portions 27 of the bails project into the meter opening 7 so that when a meter is inserted it seats on the bails, thereby limiting the extent to which the meter may be inserted. The ends of the legs 28 engage the back 29 of the box on opposite sides of raised portions 31 which are embossed in the back of the box to hold the legs in position when a meter is pressed against the central portions of the bails.

Similar bails 32 and 33 are similarly mounted on the ends of the box as disclosed and claimed in the application of Kenneth H. Foskett, Ser. No. 833,550, filed August 13, 1959.

It should be understood that the present disclosure is for the purpose of illustration only and that this invention includes all modifications and equivalents which fall within the scope of the appended claims.

I claim:

1. A meter trough comprising an elongate box having a back and an open front to receive a row of plug-in meters having laterally projecting bases, a U-shaped channel extending crosswise of the box between adjacent meter positions, the edges of the channel being directed away from the back of the box at said open front, for each meter position a cover having a meter opening and side flanges extending toward said back, the side flanges of adjacent covers extending into said channel, and stops on said channel with portions behind said openings adjacent the periphery thereof to limit the extent to which the adjacent meters may be inserted into the box, said stops comprising bails having their central portions constituting said portions, with their ends extending under the associated cover toward the channel and thence rearwardly toward said back.

2. A socket according to claim 1 wherein said back has forwardly projecting portions overlapping the ends of the bails.

3. A meter trough comprising an elongate box having a back and an open front to receive a row of plug-in meters having laterally projecting bases, a U-shaped channel extending crosswise of the box between adjacent meter positions, the edges of the channel being directed away from the back of the box at said open front, for each meter position a cover having a meter opening and side flanges extending toward said back, the side flanges of adjacent covers extending into said channel, a support on the channel with parts projecting laterally from the channel, and stops detachably mounted on said parts with portions behind said openings adjacent the periphery thereof to limit the extent to which the adjacent meters may be inserted into the box, said stops comprising bails having their central portions constituting said portions, with their ends extending under the associated cover toward the channel and thence rearwardly toward said back.

4. A socket according to claim 3 wherein said back has forwardly projecting portions overlapping the ends of the bails.

References Cited in the file of this patent
UNITED STATES PATENTS

| | | |
|---|---|---|
| 2,891,693 | Fosburgh | June 23, 1959 |
| 2,907,928 | Rutledge | Oct. 6, 1959 |